(12) United States Patent
Schubert

(10) Patent No.: US 6,930,304 B2
(45) Date of Patent: *Aug. 16, 2005

(54) PROCESS AND APPARATUS FOR ISOTOPE SEPARATION IN LOW-GRAVITY ENVIRONMENT

(76) Inventor: Peter J. Schubert, 310 W. Greyhound Pass, Carmel, IN (US) 46032

( * ) Notice: Subject to any disclaimer, the term of this patent is extended or adjusted under 35 U.S.C. 154(b) by 112 days.

This patent is subject to a terminal disclaimer.

(21) Appl. No.: 10/604,074

(22) Filed: Jun. 25, 2003

(65) Prior Publication Data

US 2004/0004184 A1 Jan. 8, 2004

Related U.S. Application Data

(63) Continuation-in-part of application No. 09/387,921, filed on Sep. 1, 1999, now Pat. No. 6,614,018.

(51) Int. Cl.$^7$ .......................... B01D 59/44; H01J 49/00
(52) U.S. Cl. .................. 250/284; 250/281; 204/157.22
(58) Field of Search ................. 250/281, 284; 204/157.22

(56) References Cited

U.S. PATENT DOCUMENTS

| | | | | |
|---|---|---|---|---|
| 4,320,300 A | * | 3/1982 | Mariella, Jr. ............. | 250/423 P |
| 4,800,100 A | * | 1/1989 | Herbots et al. ............. | 427/527 |
| 5,025,152 A | * | 6/1991 | Cordfunke et al. ......... | 250/281 |
| 5,224,971 A | * | 7/1993 | Mukaida et al. ............... | 95/28 |

* cited by examiner

Primary Examiner—John R. Lee
Assistant Examiner—Paul M. Gurzo
(74) Attorney, Agent, or Firm—Gary M. Hartman; Domenica N. S. Hartman; Hartman & Hartman (57) ABSTRACT

A process and apparatus for separating element isotopes in a microgravity or low-gravity environment using electromagnetic radiation, e.g., sunlight, to heat and ionize a stream of raw materials, followed by electromagnetic separation, and collection of the desired isotopes in or on one or more collection surfaces or receptacles, such as a rotating surface. A cylindrical mirror can serve to collect and concentrate the electromagnetic radiation, permitting the stream of material to be heated and ionized while the path of the stream of material is oriented other than parallel to the direction of the radiation.

30 Claims, 4 Drawing Sheets

PROCESS AND APPARATUS FOR ISOTOPE SEPARATION IN LOW-GRAVITY ENVIRONMENT

CROSS REFERENCE TO RELATED APPLICATIONS

This is a continuation-in-part patent application of U.S. patent application Ser. No. 09/387,921, filed Sep. 1, 1999, now U.S. Pat. No. 6,614,018.

BACKGROUND OF INVENTION

1. Field of the Invention

The present invention generally relates to fields of study in three broad categories: ion separation; plasma physics; and low-gravity processing. Within the category of ion separation, relevant sub-fields include: mass spectroscopy, ion implantation, and isotope separation. Within the category of plasma physics are relevant sub-fields of: thermal spray and magnetohydrodynamics. Under the category of low-gravity processing lie the sub-fields of: heating systems and element separation techniques. Also pertinent to this invention, but well known to those skilled in the art, are the sciences of: optics, solar power generation, material crushing or grinding, chemistry, magnetics, electrostatics, radio-frequency electromagnetics, radiative cooling, and static and dynamical mechanics. The present invention involves each of these fields, and more particularly relates to a process employing these technologies to separate isotopes in low-gravity using electromagnetic radiation (e.g., solar power) as the energy source.

2. Description of the Related Art

In the field of mass spectroscopy, a sample is ionized and sputtered from the matrix being studied, through bombardment by another ion such as oxygen or argon. A sample analyzer segregates isotopes through the application of a magnetic field. As ions of charge q, with a velocity v and mass m pass through a magnetic field of strength B, they experience a force perpendicular to the field direction according to the Lorentz force, F=qvxB(italicized quantities are physics variables, and bolded quantities are vectors; F is force, a is acceleration, m is mass, q is electron charge, v is velocity, B is magnetic field strength, E is electric field strength, and x is the cross product operator). This force causes an acceleration in a direction normal to the original velocity according to Newton's law a=F/m. Because different ions have different masses, the acceleration they receive is different. This effect is exploited to separate out the various elements and isotopes of the matrix under study. Suitable collectors monitor the amount of charge impinging at the location associated with various isotopes, providing an indication of their presence, and an approximate indication of their relative abundance. Prior art in the field of mass spectroscopy include U.S. Pat. No. 4,066,895 to Iwanaga; U.S. Pat. No. 4,174,479 to Tuithof et al., U.S. Pat. No. 5,220,167 to Brown et al., U.S. Pat. No. 3,443,087 to Robieux et al., and U.S. Pat. No. 3,772,519 by Levy et al. This technique of magnetic separation is widely used in many fields, as will be discussed below. The current invention also uses magnetic separation as a constituent component, and as such its understanding of this field is crucial to understanding this invention. However, the means of ionization and collection are substantially different.

In the field of ion implantation, used typically for semiconductor manufacture and for impregnation of specialty materials, a gaseous molecule containing the element of interest is ionized using a radio frequency plasma. The plasma field causes dissociation of the molecule, and causes an excited state of the element to be implanted. All excited species of charge q are then accelerated using electrostatic fields of strength E according to the equation F=Eq. The accelerated ions are collimated and passed through a magnetic field to separate the various isotopes. A suitable shutter system is employed to select the ion of interest, which is then allowed to proceed toward the substrate to be implanted with this ion. However, along the beam path, between the separation magnet and the substrate, dynamic electric fields, oriented typically in two perpendicular directions to the beam axis, are employed to deflect the beam slightly. This deflection is used to cause the beam to be scanned across the substrate, typically with the desire to uniformly cover the substrate area. Once the beam arrives at the substrate, typically with a relatively high velocity and relatively low density, the ions will impinge upon the surface, and penetrate to a distance determined by the beam energy, the ion mass, the angle of incidence, and the atomic mass and crystal orientation of the substrate. Several patents in this area include U.S. Pat. No. 4,841,143 to Tamura et al., and U.S. Pat. No. 5,751,002 to Ogata et al. The present invention uses the principles of dynamically scanning a beam using electric fields, and as a preferred embodiment, will use shutters select a specific isotope. However, the method of ionization is substantially different, and the means of collection are substantially different.

Isotope separation, as a field of study, is principally used to enrich uranium with the isotope of atomic weight 235, relative to the much more abundant $U^{238}$. A number of patents in this field demonstrate a wide variety of techniques for achieving isotope enrichment, such as U.S. Pat. No. 3,935,451 to Janes, U.S. Pat. No. 3,940,615 to Kantrowitz, U.S. Pat. No. 4,202,860 to Miyake et al., U.S. Pat. No. 4,726,967 to Arendt et al., U.S. Pat. No. 5,024,749 to Snyder et al., U.S. Pat. No. 4,399,010 to Lyon et al., U.S. Pat. No. 5,422,481 to Louvet, U.S. Pat. No. 4,757,203 to Gil et al., U.S. Pat. No. 5,224,971 to Mukaida et al, and U.S. Pat. No. 3,953,731 to Forsen. Among the various techniques are those which use a linear direction of ion travel, and those which employ a spiral or cyclotron ion movement. In all cases, the uranium, or other element, such as zirconium, is first ionized using one of several different methods. The first broad class of ionization techniques involves first evaporating the material, and then ionizing it using radio-frequency (rf) energy or tuned laser radiation. Evaporation is accomplished with any of several techniques, such as Joule heating, laser bombardment or ion sputtering. Ionization with rf energy will typically excite all isotopes of the element of interest. However, with laser ionization, the frequency of radiation can be selected to preferentially ionize one isotope over another. This appears to be the preferred method in many patents, since it allows separation to be accomplished using electric fields, instead of magnetic fields, although both can be found in the patent records. Once the moving (linear or cyclotron) isotopes are ionized and separated by either electric or magnetic fields, they are collected at surfaces that are temperature controlled to allow condensation. This invention uses the techniques of collection of the separated ions on suitable surfaces. However, the heating method is substantially different, and there is substantially greater flexibility envisioned for the collection techniques, as will be described in the detailed description below.

The application of very rugged coatings of metal or ceramic is the goal of thermal spray. In each form, the material to be deposited is supplied in a powdered form carried in a stream of gas, such as nitrogen. The small particles of material are plasticized, melted, or ionized, depending on the energy supplied. This energy may be from the combustion of a reactive fuel with oxygen or from an electric arc. The heated particles of metal or ceramic are then carried to the substrate to be coated by the carrier gas, or by the velocity of the exit gasses from combustion. These particles then coat the surface of the substrate, preferably with very little surface reaction, and typically produce a very dense coating. Representative patents in the field of thermal spray include U.S. Pat. No. 3,892,882 to Guest et al., and U.S. Pat. No. 5,716,422 to Muffoletto et al. The current invention does not use a carrier gas, use combustion, or electric arcs, but it is a preferred embodiment of this invention that the material collected not interact with the substrate; thereby relating to this invention. Also, thermal spray is typically done in atmospheric environments, whereas the current invention is processed in the relative vacuum of space.

The principles of magnetohydrodynamics involve the motion of a charged medium through a magnetic field. In a typical embodiment, the momentum of the moving medium imparts a backward electromotive force which can be used for power generation. In another form, more germane to this invention, the magnetic field can be used to selectively alter the trajectories of the moving medium, which may be a plasma of ionized isotopes, for example. In this way, magnetohydrodynamics is similar in principle to mass spectroscopy. A patent describing this method is U.S. Pat. No. 4,737,711 to O'Hare. This patent also describes a method of element separation.

To prevent interaction between the elements of a plasma and container walls, magnetic confinement is typically used. This may range from the complex toroidal magnetic fields used in tokamak style fusion reactors, to simple picket fence style bar magnets placed around the plasma. In either case, the principle involved is that the charged particles (ions and electrons) in the plasma will be deflected away from the magnets through the Lorentz force. Examples of magnetic confinement are common; some illustrative examples are taught in U.S. Pat. No. 4,534,842 to Arnal et al.; U.S. Pat. No. 4,937,456 to Grim et al., U.S. Pat. No. 4,093,427 to Schlenker, and U.S. Pat. No. 4,672,615 to Kelly et al.

A materials processing environment in a circular orbit around a massive body is essentially in a free-fall, where the effects of static gravity, such as are felt on the surface of such a massive body, are not felt, or are very small. Such a microgravity environment has certain advantages for materials processing. The sedimentation or settling of materials of varying densities in a suspension does not occur, allowing the formation of more homogenous materials in orbit than on the surface of a planet or planetoid. The relatively less stringent requirements for fixturing are another feature exploited in some patents on microgravity processing. A sample of microgravity processing patents is U.S. Pat. No. 5,196,999 to Abe. Several of these advantages are important to this invention as will be described in the sections below.

Many methods for the separation of chemical elements or molecules in space have been proposed and studied. For the most part, these include the use of reagents, catalysts, and consumable chemicals which must be brought from a planet such as Earth, at great expense. Furthermore, the equipment for these processes tends to be very expensive and intricate, requiring significant maintenance. It is a significant advantage of this invention that it requires no reagents, catalysts, or consumable chemicals, no reaction vessels, and very little maintenance. This current invention has very little in relation to these chemical means of element extraction, but this area is included for completeness. References to these schemes can be found in U.S. Pat. No. 4,737,711 to O'Hare (noted above), U.S. Pat. No. 5,374,801 to Leung, and U.S. Pat. Nos. 5,096,066 and 5,153,838 to Kindig.

SUMMARY OF INVENTION

According to the present invention, there is provided a process and apparatus that achieves continuous-feed all-isotope separation in a microgravity or low-gravity environment using electromagnetic radiation, e.g., solar power. In this process, a stream of material, such as crushed rock or waste materials, is given a velocity and directed on a substantially linear path. This may come from an impeller, a solar furnace, a pair of electric field (electrostatic) acceleration grids, or other device which imparts a velocity to the stream, and may be fed from a hopper of material, or directly from a bore hole in an asteroid, for example. Once the material is given a velocity, it is heated and ionized along its path by concentrated sunlight, radio-frequency ionizing radiation, and/or laser irradiation. A magnetic confinement scheme to maintain the cross sectional area of the beam can be used to counteract the effects of thermal diffusion and self-scattering. Physical confinement can also be used to maintain a tight beam of material, possibly at one or more locations along the stream path. Solar or laser radiation not absorbed by the stream is optionally collected by suitable placement of solar panels which convert the radiant energy into electrical energy available for use in the operation of the apparatus.

The ionized stream can be deflected using electrostatic fields, which are disposed around the beam such that a plurality of deflection orientations and angles can be achieved. This serves three purposes: that of separating ionized from nonionized material; separating out individual isotopes from the ion stream; and for providing additional attitude control for the entire structure by allowing some of the stream to exit the apparatus uncollected. Optional acceleration or deceleration using additional electrostatic fields may also be employed. The various isotopes of the stream can be separated differentially depending on their charge and mass. The individual streams of separated isotopes can then be collected in a variety of ways, including, but not limited to: simply impinging on a planar surface; the use of slits or shuttering for very high purity; the use of a moving (e.g., rotating) substrate to allow spatial patterning of the deposited material; implanting of the ions for material preparation; combining isotopes or layering them to produce composite or compound materials; and cooled condensation of volatile gasses. The neutral (nonionized) stream can be collected separately, for its reprocessing value, as well as its momentum. The waste heat from the neutral stream, and the collected isotopes can be used in a closed loop thermal generator for addition production of electrical or mechanical energy.

In view of the above, the present invention provides numerous benefits and structural and processing options. Any material can be fed into the apparatus for separation into isotopes. For example, one application for the apparatus is waste reprocessing in a recycling loop. Continuous operation of this process is inherent to the apparatus, and only requires a steady input stream of raw materials. Multiple isotopes can be separated from the input stream. In fact, every single isotope within a given sample can theoretically be ionized and extracted. Isotope separation can be accomplished in a single pass, without cyclotron resonance or other vibrational methods for separation. Collection surfaces can optionally be tilted at a low angle to the incident stream of purified isotope, thus reducing the penetration depth and spreading the heat across a much larger surface, minimizing cooling requirements. This makes collection of volatile materials easier, and prevents reaction between beam and substrate. Residence time and temperature in the heat zone can be adjusted with mirrors and optics to allow sufficient energy to fully vaporize any material.

The heat made available with this apparatus from sunlight is sufficient to separate out most molecules into atomic elements, which are further ionized to produce a charged state. The heating is arranged so as to ionize the material as completely as possible, maintaining a high temperature, which tends to prevent the formation of molecules. The apparatus also provides for the ionizing radiation (sunlight) to be directed substantially along the material stream, and at a multiplicity of angles. This increases the cross section for absorption, thereby allowing very high efficiency for ionization fraction. The use of mirrors can allow for the gradual heating of the material stream along its line of travel. Tunable ionization through rf or lasers allows optimization of the isotope separation to very refractory materials, or other hard-to process ingredients. Broad frequency spectra can be used to excite multiple isotopes across multiple atomic species. Achieving the maximum efficiency of ionization may require a precisely tailored heating profile for a given particle throughout the duration of its transit through the ionization zone, such as may be more concentrated toward the start of the transit, or more concentrated toward the end of the transit. This, and other schemes conceivable by those skilled in the art, can be accomplished through suitable design of the collection mirrors. Multiple sections of alternate heating and confinement can be used to distribute the power requirements, and to maintain a small beam cross section along the path of the material stream. This reduces angular variation in the separated isotopes and provides for greater purity in the collected isotopes.

The Lorentz force deflects the isotopes of the beam differing degrees depending on the charge state and the atomic mass, allowing the isotopes to be collected separately. Beam speed and energy is adjustable with a number of parameters, giving an extremely wide variation in the properties of the separated isotope beams. Because the apparatus can be scaled to essentially any size, the required deflection field strengths can be minimized when input power is low, for example, in orbits distant from the Sun.

Using simple goniometer and translation stages in the isotope streams allows direct writing of highly-purified materials onto any conceivable surface. The use of electrostatic field, parallel to the velocity of the separated isotopes, can be used to reduce that velocity for the purposes of reducing the heat energy delivered to the collection receptacle. Alternatively, the velocity can be increased by reversal of these electrostatic fields to provide for greater penetration of the isotopes. By generating multiple isotope streams, the creation of superlattices with an extremely versatile spectrum of physical and material properties is possible, permitting the replication of almost any conceivable structure.

The axial design with lens and mirrors facing the Sun provides radiation and contamination protection to down-beam components, inherent to the design. The arrangement of the sunlight concentrating and other heating elements can be arranged so as to block solar wind from contaminating the stream.

An impeller/feeder pipe design can be used to input the material stream to provide for separating out particles of various size, and directing them to kinetic energy adding devices and nozzles such that each of these various streams is optimized for desired velocity and minimal spreading of the material stream. Multiple nozzles, each feeding a fraction of the material stream, which may be homogenous or heterogeneous, can be used to optimize the mixing and minimize the self-scatter, spreading, and range of velocities of the entire beam. Use of a solar furnace may be used in place of an impeller to eliminate moving parts, and impart a thermal velocity to the material stream. Preheating with a solar furnace also lessens the heating requirements along the material stream path.

The momentum and torque imparted to the initial material stream can be arranged so as to allow control of the entire apparatus in a desired orbit and attitude toward an energy source, like the Sun. The apparatus enables the conservation of total momentum of the material stream, allowing it to remain in a substantially stationary position with respect to a desired relative location in space. This provides the opportunity to have the apparatus placed in orbit around a body other than the Sun, while using lightweight movable mirrors to direct the solar radiation to this invention. The entire structure can be moved through controlled imbalances in the impeller motion, the separation elements, or magnetic field placed in the path of the ion streams. A suitable controller can use this ability to self-align the structure to a desired orientation, using only internal signals such as gyroscopic or stellar position-determined, eliminating or greatly reducing the need for chemical or electric propulsion requiring fuel.

The apparatus of this invention can be used to make many of the materials for replicating itself, thus approximating a von Neumann machine, which makes it suitable for highly-automated material processing and fabrication facilities. Sunlight can be used directly in the processing of material, as well as indirectly or optionally in the electric power generation for individual components, such that auxiliary and exhaustible energy sources are unnecessary. Alternate sources of electromagnetic radiation can be used to power the apparatus, including laser radiation coaxial and coincident with the material stream. Sunlight and material inputs to this invention can be very nearly used in their entirety so that waste is very low and processing efficiencies approach 100%, assuming neutral beam constituents are reprocessed. By collecting numerous elements simultaneously, the apparatus avoids the need for separate chemical processing units designed for specific classes of molecules. The lack of requirements for externally supplied reagents allows the apparatus to be operated at very low ongoing costs, and the lack of moving parts provides for very long time between failures.

The apparatus and process can be used either in free-floating orbit, on a body (e.g., the moon) that provides a low-gravity environment, or rigidly attached to a planetoid with modification to the arrangement of mirrors and impeller/feeder tube assembly. Rigidity and inertia to rotation movement can be optimized by providing a substantially uniform distribution of moments about the center of mass, and designing the structure to have a roughly spherical envelope or outer perimeter, such perimeter including impeller devices, a neutral particle receptacle and cooling apparatus, and solar collection panels. Because of the vacuum of space, the apparatus need not include a container, need not have a controlled atmosphere, and concerns about contamination are greatly reduced, compared to devices designed for an environment with atmospheric pressure. The use of structural members is greatly reduced by the superstructure design such that tensile loads balance the momenta of sunlight and the material and isotope streams. The threefold symmetry of the preferred embodiment is not a restriction of the design. Higher order symmetry can also be used. Alternatively, the apparatus can be configured to lack symmetry, provided that the overall balance of design considerations is still incorporated, that of positional stability, attitude control, and interdependence of the various components of the system.

While this invention draws from many fields of study, the combination and arrangement of elements allow advantages not possible with existing methods of isotope separation. An advantage of this invention lies in its holistic design concept and unified principle of operation, taking full advantage of mechanical, radiative, thermal, and electrical energies to produce a device capable of low-maintenance, high-reliability operation, with minimal external supply needs, making it especially efficient for remote operation, providing near-geometrically increasing economic returns. These advantages further provide for the raw materials and some of the power needs for construction and manufacturing processes in orbit, without the cost and risk of raising these materials from the surface of a planet or planetoid. It is expected that the realization and implementation of the apparatus and process will greatly facilitate the advance of human utilization and colonization of space.

Other objects and advantages of this invention will be better appreciated from the following detailed description.

DETAILED DESCRIPTION

Figure 1:
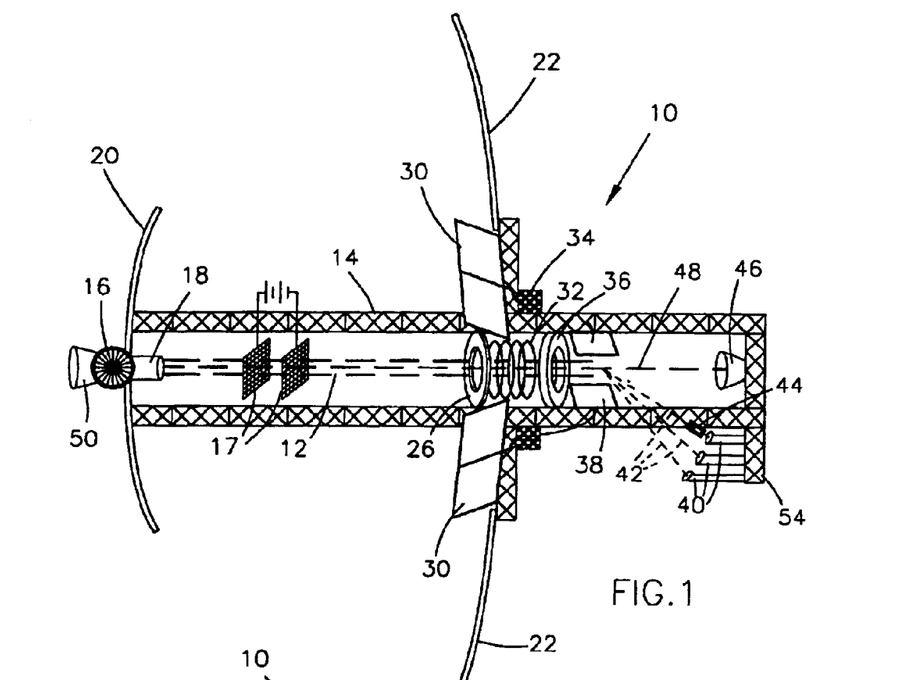
FIG. 1 represents an isotope separation apparatus in accordance with an embodiment of this invention, showing the material input through a mechanical impeller, concentrating mirrors, a radio-frequency coil for additional ionization, a confinement magnet, an electrostatic separation stage, collection receptacles for the separated isotopes (one of which has a slit), and a collection receptacle for the neutral beam.

This invention presents an apparatus and process for the continuous-feed operation of a device capable of separating a plurality, or the entirety, of isotopes in a given material input stream in a single pass through the apparatus, using electromagnetic radiation (e.g., solar power, laser power, etc.) as the energy source, and using microgravity and low-gravity environments in the vacuum of space to provide additional advantages in attitude control, thermal energy conversion, and integrated design. With reference to FIG. 1, the principle of operation of an apparatus 10 configured in accordance with this invention is to first produce a stream 12 of matter, preferably in powdered form with particles of uniform size or pre-vaporized from a solar furnace, of substantially the same velocity; then heat the matter until it fully vaporizes and substantially ionizes, further ionize the matter with radio-frequency (rf) or laser radiation; then use electric or magnetic fields to impart a change of velocity dependent upon the charge state and mass of the ionized elements (isotope); and finally to collect the isotopes separately in any of various configurations depending upon the end use. The design principles important to this invention are that sunlight is used as the primary energy source, being used in concentrated form to perform multiple tasks, such as vaporization, ionization, electric power generation, and momentum balance. A further feature is the ability to adjust the orientation in space of the entire superstructure 14 of the apparatus 10 through the selective use of a multiplicity of separation elements and the selective use of a multiplicity of velocity-imparting elements. A final feature is the flexibility of scale, permitting a very wide range of spatial dimensions in both principal axes, as well as process settings to take advantage of the various physical and electrical properties of the entire spectrum of isotopic elements.

Figure 2:
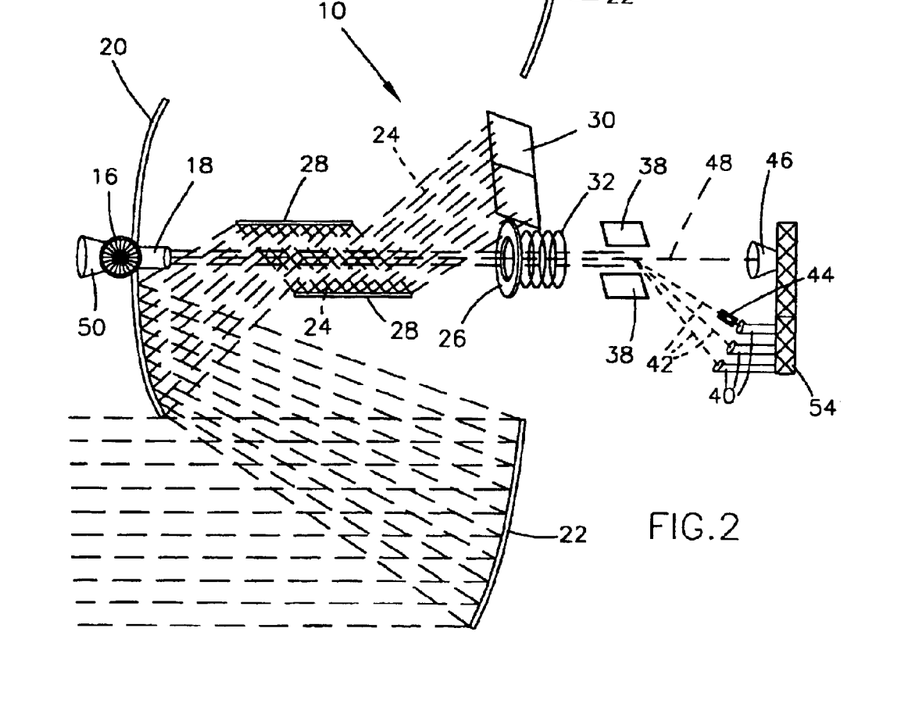
FIG. 2 is a simplified schematic showing ray tracing for sunlight used in the process of this invention, whereby collecting and concentrating mirrors direct the sunlight to a material stream being processed.

FIGS. 1 and 2 illustrate the basic structure and operation of the invention (the superstructure 14 of the apparatus 10 is omitted in FIG. 2 for clarity). The threefold symmetry of the apparatus 10 causes some elements to overlap in the two-dimensional schematic, though these elements are separated to some extent in the direction out of the plane of the paper. For the purpose of discussion, the principal axis of the machine superstructure 14 is taken to be oriented substantially toward the Sun, although with the use of differently-configured and/or auxiliary mirrors to reflect sunlight, the principal axis could be any orientation desired, as subsequently discussed with respect to FIG. 6.

Figure 6:
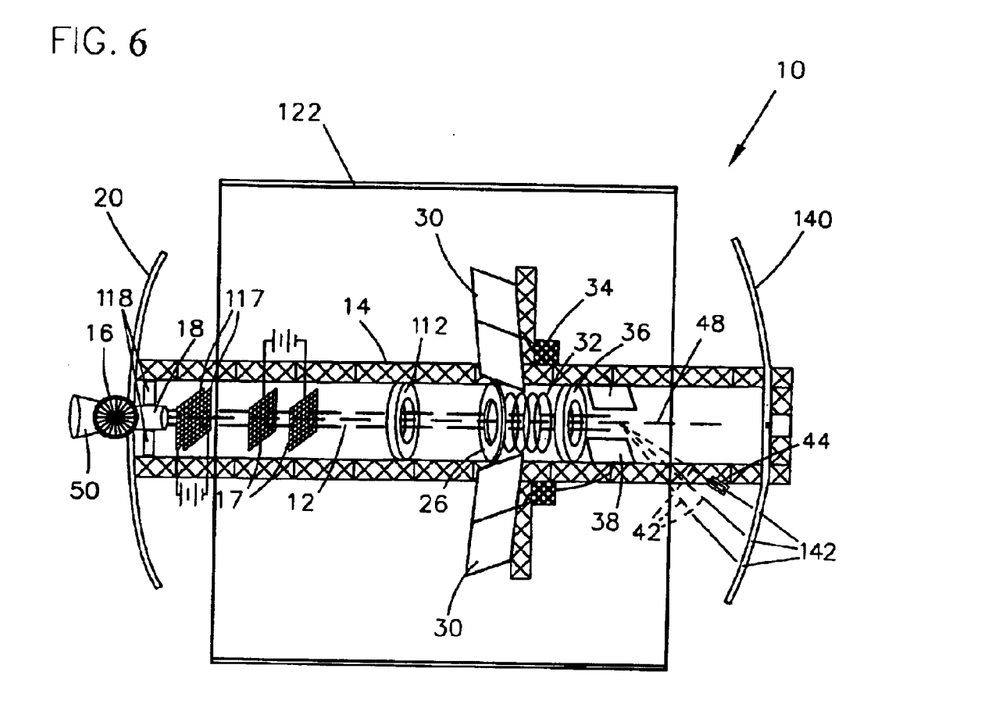
FIG. 6 represents an isotope separation apparatus incorporating additional features in accordance with this invention.

The raw material to be processed, while preferably powdered regolith or asteroidal material, could be any material, even waste products from a human settlement in space, for example. This material is preferably made small enough to be fed through a hopper 50 to one or more impellers 16 that mechanically impart velocity to the material stream 12, although other means for imparting a velocity to the material stream 12 could also be envisioned, such as a solar furnace which vaporizes the material, giving it a thermal velocity without the use of moving parts. Furthermore, the apparatus 10 may make use of a combination of velocity-imparting mechanisms, as depicted in FIG. 6 in which a radio-frequency electromagnetic field generator 118 is used to partially ionize the raw material flowing through a channel or tube 18 downstream of the impellers 16. A plasma created in this manner is then accelerated electrostatically with a pair of electrostatic plates 117. In general, such accelerated atoms will quickly collide with non-ionized raw materials, and thereby impart momentum to the material stream 12. The combination of electrostatic and mechanical velocity-imparting mechanisms may give certain advantages of higher material speed and more efficient ionization through preheating of the material stream 12, though a potential tradeoff is that a wider distribution in particle velocities may occur. As one approach to at least partially counteract this effect, FIG. 6 depicts a beam confinement device 112 surrounding the material stream 12 downstream from the electrostatic plates 117. In a particular embodiment, the confinement device 112 is some form of magnet or magnets adapted to preserve the stream cross-section so that spreading is minimized. If magnetics are employed, the device 112 can comprise, for example, dipole, quadrupole (or octopole) magnets, and be either stationary or rotating.

Figure 5:
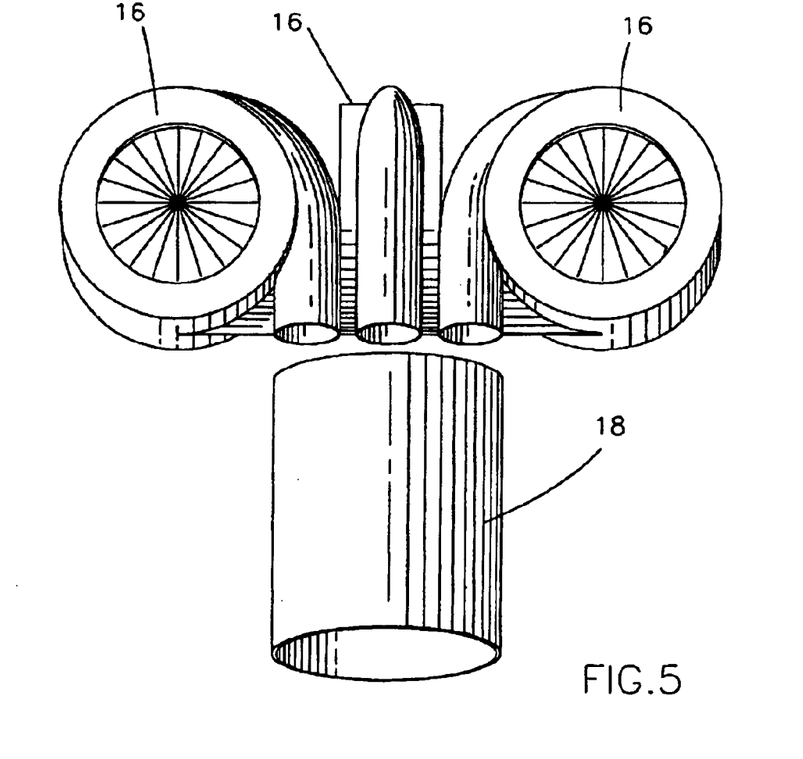
FIG. 5 schematically represents an impeller assembly suitable for use with the apparatus of this invention.

Each impeller 16 (or other suitable velocity-imparting device) receives regolith from a supply with essentially zero momentum, and directs it through the tube 18 along the axis of the apparatus 10. As depicted in FIG. 5, the apparatus 10 may make use of three such impellers 16, each supplying a portion of the total stream 12, separated either spatially or temporally across the entire stream cross section. The use of three (or more) impellers 16 allows control of the torque imparted to the apparatus superstructure 14. By controlling the mass flux of material fed through each impeller 16, and by further controlling the collection or passing of isotope streams 42 in collection receptacles 40 (discussed below), the net torque imparted to the superstructure 14 can be balanced. This allows a provision to maintain a constant attitude respect to the Sun (or other fixed point). Alternatively, the net torque can be unbalanced in a controlled way, to add a desired angular component to the velocity of the superstructure 14.

The material stream 12 is shown in FIG. 1 as being accelerated by a pair of electrostatic acceleration grids 17, similar to the practice of using polarized electric field grids used in vacuum tubes. The material stream 12 pass through the holes in the grids 17, and is accelerated by the electric field between the grids 17 generated by an applied voltage. Thereafter, the stream 12 passes through a hole in the center of a concentrating mirror 20, shown in FIG. 4 as being composed of multiple individual mirrors. This mirror 20, and a collecting mirror 22 reflecting sunlight toward it, are designed to have the desirable property of providing heating along the length of the stream 12, thereby increasing the residence time of the particles within the source of heat. The light impinging on the stream 12 also adds a component of momentum along the stream, thereby adding light pressure to accelerate the stream to a certain extent. The physical barrier of the concentrating mirror 20 also serves to shield the downstream components from direct impinging by the solar wind, an effect which can cause degradation of those components.

Figure 4:
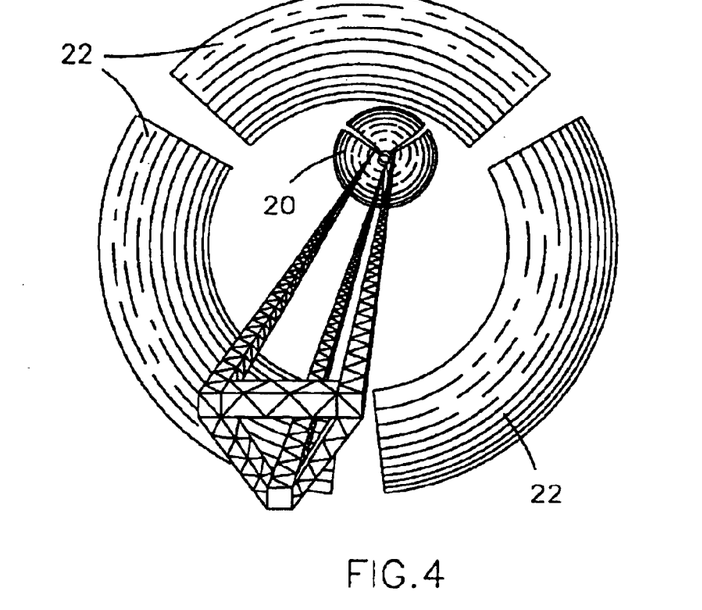
FIG. 4 is an end-on perspective view along the axis of the apparatus of FIG. 1, illustrating the threefold symmetry of the apparatus.

In FIGS. 1 and 4, the collecting mirror 22 is shown as being a series of individual mirrors radially further from the principal axis than the concentrating mirror 20 so as not to be in its shadow, and surround the concentrating mirror 20 to reflect sunlight into it. The collecting mirror 22 can be arranged in a variety of configurations. One preferred embodiment is to focus light at one or several points along the path, with the intermediate areas containing a physical or magnetic confinement device (not shown) to maintain a light beam 24 of small cross section, since thermal spreading would tend to enlarge the beam cross section along the path of the stream 12 of material. The light beam 24 provides heating along the material stream path up to a shielding ring 26 described below. It is a preferred aspect of this invention that additional reflectors 28 (shown in FIG. 2) be included to redirect any unabsorbed light photons back through the stream path, leapfrogging the confinement devices. Any additional light still not absorbed can be captured by solar panels 30 as shown in FIG. 1, which converts that excess sunlight to electrical energy for use in other components of the apparatus 10.

An alternative mirror configuration is depicted in FIG. 6, in which a cylindrical collecting mirror 122 is represented as having an axis that is coaxial with the material stream 12. The cylindrical collecting mirror 122 permits operation of the apparatus 10 while the principal axis of its superstructure 14 is oriented other than parallel to the direction of photons coming from the Sun. In particular, the cylindrical shape of the collecting mirror 122 enables light to be focused along the axis of the path of the material stream 12 while the axis is oriented substantially perpendicular to the direction of sunlight. It is foreseeable that the cylindrical shape of the collecting mirror 122 may also provide certain advantages in construction simplicity.

Although the thermal and electromagnetic energy of the concentrated sunlight, depending on the intensity, will ionize most or all of the isotopes of the material within the stream 12, additional ionization of the material may be desired. This may be used to achieve desired charge states, or simply to prevent recombination of molecular components in the beam. To achieve this, an rf plasma or laser radiation ionization mechanism can be used on the material stream 12. In FIG. 1, rf coils 32 are shown, driven by a generator 34 powered by the solar panels 30. It may be desirable for the rf field to extend further than indicated in FIGS. 1 and 2, to prevent recombination or de-ionization of the material stream 12. The shielding ring 26 serves as a physical barrier between the refracted and reflected light and the rf coils 32, as well as all other downstream components, and is desirable for the purpose of longevity and reliability of downstream components. Suitable designs and materials for the shielding ring 26 are generally known in the art, and will not be discussed here in further detail.

There are several mechanisms which will tend to cause the material stream 12 to spread, or increase in cross sectional area; namely, self-scattering, thermal diffusion, electrostatic repulsion, and self-induction. These effects can be minimized if the material density in the stream 12 is low, so that interactions between ionized particles are small. However, because this reduces the yield of the separation process, it is not preferred. Another method is to make the velocity of the material stream 12 very high, so that the forces tending to increase the stream cross section have less time to act before the process is completed. Again, higher velocities require greater energy, and practical considerations may limit the extent to which this parameter can be exercised. Therefore, in the preferred embodiment of this invention, some form of magnetic or physical confinement 36 is preferably used to preserve the stream cross section, and possibly focus it such that the minimum amount of spreading is experienced at the collection receptacles.

The next component down the material stream 12 is a separation element 38, represented in FIG. 1 by electric field plates. The option of using magnetic separation may also be used, having the desirable property of providing separation independent (to first order) of the velocity of the ions of the material stream 12. However, electric field separation is preferred, because it is simpler to implement with photovoltaics, and can be switched more quickly. The requirement for rapid switching is preferred because it provides finer attitude control for the entire superstructure 14, while maintaining high processing efficiency. Whether electric or magnetic, a plurality of substantially similar separation elements 38 are disposed around or along the material stream 12. When a given separation element 38 is in operation, the deflection it imparts to a stream 42 of material isotopes will cause an equal and opposite force to be imparted to the superstructure 14. This force will be counterbalanced, in continuous operation, by the momentum received by the collection receptacles 40 downstream. To impart a net moment to the entire apparatus 10, an appropriate choice of collection receptacles 40 can be moved out of the isotope stream path to allow an exit stream of material. This uncompensated momentum can be used to change the orientation or location of the entire apparatus 10.

When three (or more) separation elements 38 are used, and switched appropriately, a moment or thrust can be imparted with infinite control. The preferred embodiment of the switching mechanisms is described in more detail below and depicted schematically in FIGS. 3a and 3b. For the purpose of understanding this aspect of the invention, either the electric force F=ma=qE, or the Lorentz force F=ma=qvxB, or both are applied to the material stream 12 containing ionized isotopes. The individual isotope atoms are then deflected out of the axis of the material stream 12 by an acceleration a=qE/m or a=qvxB/m, depending on the method used. One or more of the on-time (duty cycle), the field strength, the velocity, the charge state, and the physical distance are set so as to deflect the isotopes a desired amount, suitable for separation, and subsequent collection.

The deflected isotopes, after being separated, are then intercepted by the collection receptacles 40. These receptacles 40 may be simply planar substrates of metal or ceramic that collect the desired isotopes from the isotope streams 42. It may be desirable to interpose refinement slits 44 between the separation element 38 and the collection receptacles 40 to prevent cross-contamination of isotopes similar in atomic weight. The distance from the separation element 38 to the collection receptacles 40 can be adjusted separately for different materials. The high thermal energy of the isotope streams 42 will tend to cool off with greater distance due to radiative heat transfer to the relatively cold background of space. Therefore, more volatile elements, such as oxygen may have their collection receptacles positioned further away from the primary axis of the material stream 12.

A very wide range of collection receptacle technologies are envisioned by this invention, including those discussed above. These may include, but are not limited to, cryogenic cooling, direct-write ion beam technology, ion implantation, mass spectroscopy analysis, cyclotron separation for even greater refinement, oblique angle collection, heated collection receptacles, dissolvable substrates, prepared thin films for creation of superlattices or composite materials, and porous substrates for greater surface absorption. A particularly notable feature of the invention is to provide goniometer and translation stages in the collection process, allowing for rotational and translational movement of the collection receptacles 40. FIG. 6 represents one such embodiment, in which a rotating platen 140 having an axis of rotation coaxial with the material stream 12 is used instead of the individual collection receptacles 40 of FIGS. 1, 2 and 3b. Isotopes within the streams 42 are deposited so as to be separated within annular regions 142 on the platen 140. The rotation of the platen 140 provides certain advantages in cooling and convenience in post-processing of the deposited material.

By combining movement of the receptacles 40 and/or 140 with the refinement slits 44 or beam focusing (well known to those skilled in the art), direct writing of isotopes can be effected onto any conceivable surface. This capability allows the creation of patterned structures in two or three dimensions. By suitable use of various isotope streams, nearly any conceivable structure, device or component could be created with this invention.

Each of the three or more separation elements 38 preferably has its own set of collection receptacles 40. The duty cycle of these separation elements 38 can further be controlled so as to allow for replacement of full collection receptacles 40 with fresh ones. The collection receptacles 40 would then be available for immediate use or further processing as desired. This could be accomplished by automatic robotic control, for example. The flexibility of applications with the collection receptacles is not intended to be limited by this description, but can accommodate many preferred embodiments, as may occur to those skilled in the art.

The final element shown in the material stream 12 of FIG. 1 is a neutral element collection receptacle 46, situated on the primary material stream axis. This collection receptacle 46 gathers any material 48 that was not ionized and deflected by the upstream mechanisms. Also, if any components need to be serviced, or in the case of a failure of other components, it may be desirable to collect the remaining stream material 48. Collecting the neutral elements provides two benefits; one is that momentum is conserved along the length of the superstructure 14, thereby maintaining the attitude of the whole, while the other is that thermal energy still resident in the stream 48 can be used for such purposes as in a thermal generator for further electrical energy or mechanical work. Alternatively, it may be desired to simply move the neutral element receptacle 46 out of the material stream 48, if it becomes desired to move the superstructure 14 toward the sunlight source, or to balance a possible vector of a stream of material entering hoppers 50 that feed the impellers 18.

With the apparatus 10 described above and configured to operate with a material stream diameter of about 0.5 meters and a stream velocity of about 50 meters per second, based on a material density of about 1.0 gram/cubic centimeter (density of water), the apparatus would theoretically be capable of producing a total mass of separated isotopes of about 12 billion metric tons per year. The fractions of elements in lunar soil give an indication of potential isotope yields; oxygen is 42%, silicon is 21%, iron is 13% and aluminum is 7%.

FIG. 2 shows more detail of the collecting mirror 22, the concentrating mirror 20, the multiplepass reflecting mirrors 28, and the solar collection panels 30. As indicated in FIG. 2, solar radiation, or sunlight, is assumed to arrive from a distant point source so that the wavefront is essentially a plane perpendicular to the axis of the material stream 12. The large collecting mirror 22 is situated some distance from the main axis, to collect sunlight which passes around the periphery of the concentrating mirror 20. The collecting mirror 22 is preferably large, its size being dependent on the desired ratio of light intensity at the beam compared to the intensity of the sunlight at the location of the entire apparatus 10. It is preferred that the plane of the mass centroid of the collecting mirror 22 (i.e., the individual mirrors that make up the collecting mirror 22) is situated at or near the center of mass of the entire apparatus 10. This factor, in conjunction with a balanced design of all the other components, can be used to minimize the overall moment of the apparatus 10, thereby minimizing the energy expenditure needed to adjust the attitude of the whole. The concentrating mirror 20 is preferably designed to focus the sunlight along the length of the material stream 12 (as opposed to a single point), in cooperation with the multiple-pass reflecting mirrors 28 so that the heating of the stream 12 realizes the greatest degree of ionization. The flexibility possible with this scheme allows for the balancing of several considerations. For example, while it is desirable to delay heating as long as possible to minimize thermal diffusion out of the stream axis; it is also desirable to distribute the energy of heating throughout the transit of the material stream 12 from the impeller 16 to the separation elements 38 to avoid hot spots and maximize ionization. Other tradeoffs exist, with respect to the need to heat the entire cross section of the material stream 12, which becomes more difficult with increased flux of material. However, the mirrors 20, 22 and 28 must be able to reflect such intense light without themselves being degraded or even melted. These and other practical design considerations are envisioned within the scope of this invention, which should be considered to encompass reasonable and obvious extensions of these concepts toward the design of the sunlight concentrating apparatus. The solar collection panels 30 are shown as an option, since it is very likely that absorption of the sunlight will not be 100%. Therefore, any remaining sunlight can be converted to electrical energy, and used to drive the electronic components of the invention, such as the rf generator 34, the separation elements 38, the confining magnets 36, and the various motor drives that may be required for servicing or operation.

Figure 3A:
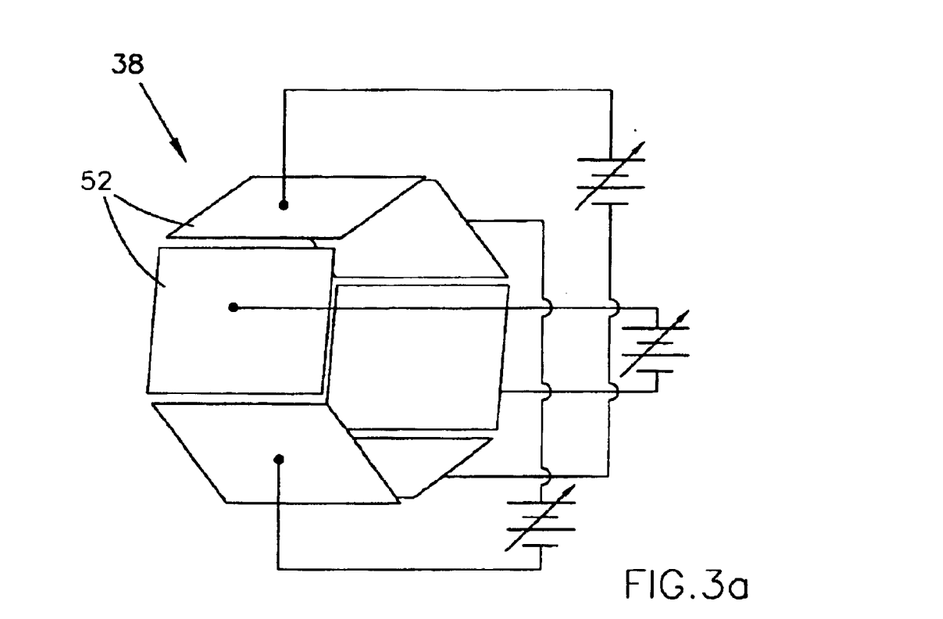
FIGS. 3a and 3b show electrostatic separation elements providing threefold symmetry.
Figure 3B:
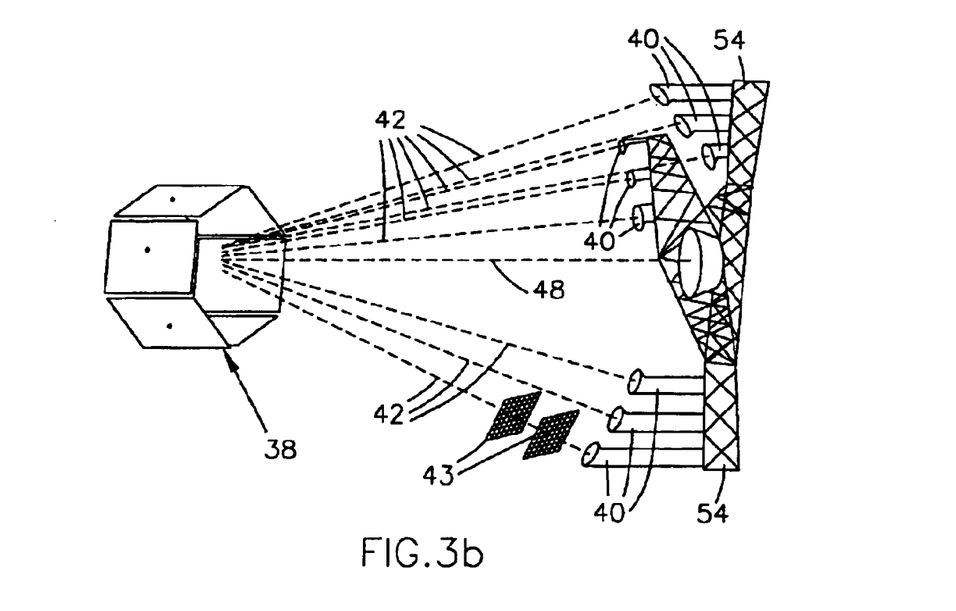

FIGS. 3*a* and 3*b* are perspective views of a simple embodiment of the electrostatic separation elements 38. In FIG. 3*a*, three opposing pairs of electrostatic field plates 52 are shown, each pair being spaced at 120 degree intervals about the principal axis of the material stream 12. FIG. 3*b* shows a wider perspective, illustrating the placement of three substantially similar collection receptacles 40. Application of a voltage across each pair of plates 52 forms a substantially uniform electric field between the two plates 52. Under the electric force, charged particles, or ions, which pass through this field, will undergo an acceleration proportional to their charge state, the electric field strength and inversely proportional to their mass, i.e., $a=qE/m$. Thus, the moving ions will be given a velocity component perpendicular to the principal axis, proportional to the length of time these ions are within the electric field. Thus for particles moving at a velocity v, and an electrostatic field plate length (along the axis) of L, the velocity component, dv, is $dv=qEL/mv$. This velocity component dv causes the ion stream to separate. As long as the velocity is substantially equal among the ions of the stream, the isotopes are separated by the ratio of their charge to their mass. This separation is used to advantage by the collection apparatus. Desired components are captured simply by suitable placement of the collection receptacles 40 with respect to the principal axis. FIG. 3*b* shows three collection receptacles 40 disposed on each of three collection receptacle systems 54. However, in general, there will be many such receptacles 40 on each system 54, to extract the maximum useful elements from the material stream 12. As described briefly above, servicing of the collection receptacles 40 is facilitated by altering the duty cycle between collection receptacle systems 54, allowing maintenance or replacement to be performed. For the neutral beam receptacle 46, placed directly in the material stream path along the principal axis of the apparatus 10, servicing is accomplished by imposing an additional neutral beam receptacle (not shown) in front of the one to be serviced to intercept the material stream 48. The reverse operation is then used when the second neutral beam receptacle needs to be serviced or replaced. It is envisioned that the operations of attitude control, and servicing would be accomplished to large extent by autonomous control and suitable robotics, to minimize the human labor needed for operation.

Considerable variety in the collection receptacles 40 has been stated already, to accommodate different elements, different uses of these elements, and considering subsequent transportation and processing. The illustration showing the receptacles 40 as cup-like saucers is intentionally simple to convey the concept, however, the sophistication of these receptacles 40 may be considerable. A wide body of knowledge exists with respect to these collection receptacles 40, as evidenced by the related discussion above. Additional features that might be included, but which are not envisioned in the prior art, are the use of an electrostatic field to slow the velocity of the isotope streams 42. This can be extremely useful to prevent overheating of the collection receptacles 40, and to minimize the penetration depth of the isotopes. In contrast to the separation elements 38, these electrostatic field plates would preferably define a pair of electrostatic acceleration grids 43 to admit the isotope stream 42, but the voltage would be applied in a direction and magnitude so as to impart a velocity opposite to the incoming isotope. This feature can also be used in reverse to add velocity to the isotopes where required, such as upstream of the separation elements 38, for example to provide greater angular separation through a greater ion velocity. Not shown are other facilities to more fully utilize the collection receptacles 40, such as positioning mechanisms, gated shutters, slits for highest purity at the possible expense of throughput, refrigerated collection, and many other manifestations that would be well known to those skilled in the art.

The threefold symmetry of the electrostatic separation elements 38 and the collection apparatii 40 and 54 provides several interacting advantages in the continuous operation and adjustment of the apparatus 10 of this invention. Collection receptacles 40 for the most part, must be continually replaced as they become saturated with their target element, or when their substrate has received the desired amount of isotopes. The velocity component imparted to the ions of the material stream 12 cause an equal and opposite force on the electrostatic separation elements 38, which must be accounted for since this apparatus 10 is designed to float freely in space (although it could also be used on a planetary surface, with suitable modifications). That force will be exactly canceled if all components of the material stream 12 are collected. This is desired for steady state, continuous operation, with an orbit or position fixed with respect to the source of light. However, it is anticipated that the need for continuous minor adjustments will be provided for by the simple principle of allowing some or all of the material stream 12 (e.g., via an isotope stream 42 or the stream 48) to exit the apparatus 10 without capturing that portion of the momentum. With a multiplicity of collection receptacle systems 54 (three or more), and a multiplicity of collection receptacles 40 within each system 54 (as many as there are elements to be captured), simply moving the position of one or more collection receptacles 40 on the appropriate arm or arms of one or more collection receptacle systems 54, allows an infinitely variable degree of attitude control in yaw or pitch. Roll control can be provided in an integrated way, as described with reference to FIG. 5 below. This control can be used to provide three independent degrees of freedom of movement for the entire apparatus 10. Furthermore, an additional degree of freedom can be achieved by removal of the neutral beam collection receptacle 46, imparting a net force along the axis of the material stream 12 in the direction of the light source. This may allow the apparatus 10 to be moved to different orbits without the need for external fuel.

In FIG. 4, a perspective view is presented of the entire apparatus 10, showing only the large structures from a viewpoint opposite the sun and substantially along the main axis of the material stream 12. The key features to note are the relative placements of the individual mirrors of the collecting mirror 22 and the concentrating mirror 20. The inner diameter of the collecting mirror 22 need be no smaller than the outer diameter of the concentrating mirror 20, to avoid excess mass where the collecting mirror 22 would be in shadow. The three breaks shown in both sets of mirrors 20 and 22 correspond to the three structural members supporting the various elements of the invention and which preferably lie close to and along the path of the material stream 12. This prevents the concentrated sunlight from heating and weakening those members and the associated equipment. The additional reflecting mirrors 28 shown in FIG. 2 are used not only for more efficient heating of the stream 12, but are also useful for preventing concentrated sunlight from impinging on sensitive portions of the apparatus 10. The design of these mirror systems can of course be more complicated than what is depicted here. Variations in the degree of symmetry (e.g., fourfold or higher order symmetry), the number of mirrors in the system, the distribution of focusing and reflecting of the various optics, are all possible variants on this basic principle, and are considered inclusive of this description. Other technologies such as diffraction gratings, lenses, prisms, deformable mirrors, micro-machined reflecting devices, and other known optical devices are likewise considered elaborations on this basic concept.

As previously noted, FIG. 5 shows a simple embodiment of an impeller apparatus, with threefold symmetry to balance the torque on the main axis of the superstructure 10. A simple feeder pipe 18 is shown to provide a substantially columnar material stream 12, though a more complicated nozzle apparatus could be used. In FIG. 5, three identical impellers 16 (combined with a blower) are shown directing their output material streams into the common feeder pipe 18. In keeping with the threefold symmetry described elsewhere, these impellers 16 might be placed at 120 degree intervals around the circumference of the inlet to the feeder pipe 18. Each impeller 16 may be fed from a hopper (e.g., hopper 50 of FIGS. 1 and 2), which was either pre-crushed, or crushed as part of the blower/impeller system. The hopper 50 can be a large container, periodically replenished and provided with a system of drawing or pushing the material into the impeller 16. This might be, for example, an inflated elastic balloon-type system, filled with for example, oxygen from the output of the isotope separation process, with a controlled orifice regulating the exhausting of gas and crushed material into the feeder pipe 18. Alternatively, the hoppers 50 could be fed in a nearly continuous manner from a stream of raw, pre-processed material directed from external to the apparatus 10, perhaps from a nearby processing plant or supply vessel. In these cases, the supply of material would preferentially be delivered along a path that cast a shadow in the gap regions of the collecting mirrors 22 in FIG. 4, so as to not diminish the power to the material stream 12, nor imbalance the apparatus 10 from an asymmetry of photon pressure to the mirrors 22. Another very important embodiment would be to rigidly mount the entire apparatus 10 to an asteroid, and deliver the processed material through a bore hole into the bulk of the asteroid where the material is mined. This of course requires that the asteroid be rotationally stable in orbit, or that a complex arrangement of auxiliary mirrors be used to maintain focused sunlight on the apparatus as appropriate.

The impellers 16 shown imply a simple blower type of system for imparting kinetic energy to a crushed or powdered medium. Such impellers 16 will impart a net torque to the entire apparatus 10, and their selective use can be employed to achieve additional dimensions freedom in attitude adjustment (roll). However, a number of advancements, well known to those skilled in the art, can be employed to improve the characteristics and velocity of the exiting material stream 12. This can range from mechanical impellers, to electrostatic accelerators, elastic balloons with orifices, or the material can simply be fed directly into a funnel connected to the feeder pipe 18, from a processing or supply station sunward of the apparatus 10. This latter method has advantages in simplicity, but the expected spreading of the incoming material due to self-scattering and diffusion would likely pose a threat to the mirrors 20, 22 and 28. However, these and many other improvements are envisioned, and while not specifically described in detail, should be considered part of this invention.

The feeder pipe 18 shown in FIG. 5 suggests a simple cylinder. However, design of this feeder pipe 18 is very important to the performance of the process described above. For example, the feeder pipe 18 may preferably act more like a nozzle, concentrating the output material to minimize the spreading which will naturally occur along the material stream 12. Another factor in the design of the feeder pipe 18 is the desire to allow mixing of the material as it travels the stream 12, so as to provide more uniform heating to all the material. The amount of such mixing must be carefully balanced with the amount of spreading that occurs until the material is ionized. Once the material is ionized, the stream 12 can be collimated by the magnetic containment 36 shown in FIG. 1, or by suitable placement of physical barriers along the material stream path. An alternative design option is the use of multiple streams from a plurality of feeder pipes. This allows each nozzle to be optimized for minimal spreading of the overall material stream 12, but each nozzle can have a slightly different trajectory, providing for some measure of mixing.

Another feature to be including in the impeller and feeder pipe design is the desire to provide as much as possible particles of identical velocity. The first step toward this goal is to provide particles to this system that are as much the same size as possible. This is especially important in the mechanical impeller embodiment, where differing momenta of the many particles may cause a wide distribution in velocity. Therefore, there may be provided a series of filters in the impeller/feeder pipe apparatus to separate particles into various size ranges, and then deliver these to various nozzles optimized for that particle size. These various apparatii, consisting of a filter, an impeller (or kinetic energy adding mechanism), and a nozzle can be configured in several ways. One, the various beams can be simultaneously delivered to the material stream 12, each at a substantially equal velocity. Once substantially complete ionization is achieved, the total range of ion velocities will be smaller than with a single impeller and nozzle, thereby providing for a tighter spatial distribution of those ions upon arrival at the collection apparatus 40 and 54, and thereby improving the purity and ease of collection for individual isotopes. Two, the beams of different particle sizes can be operated sequentially, with the various control parameters of the entire apparatus 10 adjusted during switch-over to optimize performance for that particular particle size. Such control parameters include, but are not limited to: rf frequency, location of the collection receptacles 40, and strength of the electric and magnetic fields described in reference to FIGS. 1, 2 and 3. This design flexibility allows the apparatus 10 and process to be used in various methods depending on the desired output. For example, when very high purities are desired but quantity is less important, a single nozzle can be used with a specific particle size. However, for very large throughput with relatively less concern for purity, the full array of particle sizes can be used. It is expected that incremental improvements in the control and design of these various components as are expected in the full-scale development of any project of this size may eventually allow the simultaneous optimization of purity and throughput. Other methods of delivery of powdered material, such as those described above, and others known to those skilled in the art can of course be used in this invention.

The description above, related to the isotope separation apparatus 10 and its associated process in zero gravity using sunlight, explains in detail the theory, operation, and design of this invention. Those skilled in the art will appreciate that the process carried out by the apparatus 10 is not limited to microgravity environments, but can also be performed in low-gravity environments, i.e., environments with lower gravity than that of Earth (e.g., the moon), and the operation of the apparatus 10 on a celestial body that provides such an environment is within the scope of this invention. In the text above, numerous additional improvements, options, and embodiments are referred to for the purpose of improving various facets of the useful application of this invention. The technologies involved in this invention span a wide range of human endeavor, and as such draw upon the excellent work of many previous workers. It is hoped that anyone skilled in one or more of these various arts will be encouraged to test the combinations and alternatives enumerated and suggested in the detailed description. The lack of figures for every possible alternative in no wise implies that these are not considered part and parcel of this invention. Rather the intent is to present the basic concepts, key features and design considerations.

Therefore, while the invention has been described in terms of a preferred embodiment, it is apparent that other forms could be adopted by one skilled in the art. Accordingly, the scope of the invention is to be limited only by the following claims.

What is claimed is:

1. A process for isotope separation comprising the steps of:
    imparting a velocity and direction to a stream of material along a substantially linear path within an apparatus in a low-gravity environment;
    heating and ionizing the material as it flows along the path to produce an ionized stream comprising ionized material;
    confining the ionized material along the path to maintain a cross sectional area of the ionized stream;
    deflecting at least some of the ionized material from the ionized stream to an individual ionized stream having a deflection orientation and angle away from the path, so as to separate the ionized material from any non-ionized material within the ionized stream; and
    collecting at least some of the ionized material from the individual ionized stream.

2. A process according to claim 1, wherein the apparatus is on a body that creates the low-gravity environment.

3. A process according to claim 1, wherein deflection of the ionized material is utilized to separate a stream of at least one individual isotope from the ionized stream.

4. A process according to claim 3, wherein the individual isotope deflected from the ionized stream is collected by impingement on a moving surface to generate spatial patterning of the individual isotope.

5. A process according to claim 4, wherein the moving surface is a rotating surface.

6. A process according to claim 5, wherein rotating surface has an axis of rotation coaxial with the stream of material.

7. A process according to claim 5, wherein the individual isotope is deposited on the rotating surface to create an annular pattern on the rotating surface.

8. A process according to claim 5, wherein deflection of the ionized material is utilized to separate streams of at least two individual isotopes from the ionized stream, and the individual isotopes are deflected to different individual ionized streams and deposit as concentric annular patterns on the rotating surface.

9. A process according to claim 1, wherein the material is heated and ionized by electromagnetic radiation collected and concentrated by the apparatus.

10. A process according to claim 9, wherein the electromagnetic radiation is collected and concentrated with a cylindrical mirror.

11. A process according to claim 10, wherein the electromagnetic radiation is sunlight and the cylindrical mirror collects and concentrates the sunlight to heat and ionize the stream of material while the linear path of the stream of material is oriented other than parallel to the direction of the sunlight.

12. A process according to claim 10, wherein the electromagnetic radiation is sunlight and the cylindrical mirror collects and concentrates the sunlight to heat and ionize the stream of material while the linear path of the stream of material is oriented perpendicular to the direction of the sunlight.

13. A process according to claim 1, wherein the velocity and direction imparted to the stream of material are caused by multiple feed devices, at least one of the multiple feed devices comprising a pair of electrostatic acceleration grids.

14. A process according to claim 13, wherein the multiple feed devices further comprise a radio-frequency electromagnetic field generator that partially ionizes the stream of material to create a plasma that is then accelerated electrostatically with the pair of electrostatic acceleration grids.

15. A process according to claim 13, wherein the multiple feed devices further comprise at least one impeller upstream of the electrostatic acceleration grids.

16. An apparatus for isotope separation, the apparatus comprising:
    means for imparting a velocity and direction to a stream of material along a substantially linear path within an apparatus in a low-gravity environment;
    means for heating and ionizing the material as it flows along the path to produce an ionized stream comprising ionized material;
    means for confining the ionized material along the path to maintain a cross sectional area of the ionized stream;
    means for deflecting at least some of the ionized material from the ionized stream to an individual ionized stream having a deflection orientation and angle away from the path, so as to separate the ionized material from any nonionized material within the ionized stream; and
    means for collecting at least some of the ionized material from the individual ionized stream.

17. An apparatus according to claim 16, wherein the apparatus is on a body that creates the low-gravity environment.

18. An apparatus according to claim 16, wherein the deflecting means separates a stream of at least one individual isotope from the ionized stream.

19. An apparatus according to claim 18, wherein the collecting means comprises a moving surface that collects the individual isotope deflected from the ionized stream so as to generate spatial patterning of the individual isotope on the moving surface.

20. An apparatus according to claim 19, wherein the moving surface is a rotating surface.

21. An apparatus according to claim 20, wherein rotating surface has an axis of rotation coaxial with the stream of material.

22. An apparatus according to claim 20, wherein the collecting means causes the individual isotope to deposit on the rotating surface to create an annular pattern on the rotating surface.

23. An apparatus according to claim 20, wherein the deflecting means separates streams of at least two individual isotopes from the ionized stream, and the deflecting means deflects the individual isotopes into different individual ionized streams that deposit as concentric individual annular patterns on the rotating surface.

24. An apparatus according to claim 16, wherein the heating and ionizing means collects and concentrates electromagnetic radiation to heat and ionize the material.

25. An apparatus according to claim 24, wherein the heating and ionizing means comprises a cylindrical mirror that collects and concentrates the electromagnetic radiation.

26. An apparatus according to claim 25, wherein the electromagnetic radiation is sunlight and the cylindrical mirror collects and concentrates the sunlight to heat and ionize the stream of material while the linear path of the stream of material is oriented other than parallel to the direction of the sunlight.

27. An apparatus according to claim 25, wherein the electromagnetic radiation is sunlight and the cylindrical mirror collects and concentrates the sunlight to heat and ionize the stream of material while the linear path of the stream of material is oriented perpendicular to the direction of the sunlight.

28. An apparatus according to claim 16, wherein the imparting means comprises multiple feed devices, at least one of the multiple feed devices comprising a pair of electrostatic acceleration grids.

29. An apparatus according to claim 28, wherein the multiple feed devices further comprise a radio-frequency electromagnetic field generator that partially ionizes the stream of material to create a plasma that is then accelerated electrostatically with the pair of electrostatic acceleration grids.

30. An apparatus according to claim 28, wherein the multiple feed devices further comprise at least one impeller upstream of the electrostatic acceleration grids.

\* \* \* \* \*